Jan. 12, 1926.
T. M. RUSSELL
FRICTION LINING
Filed Jan. 2, 1924
1,569,579
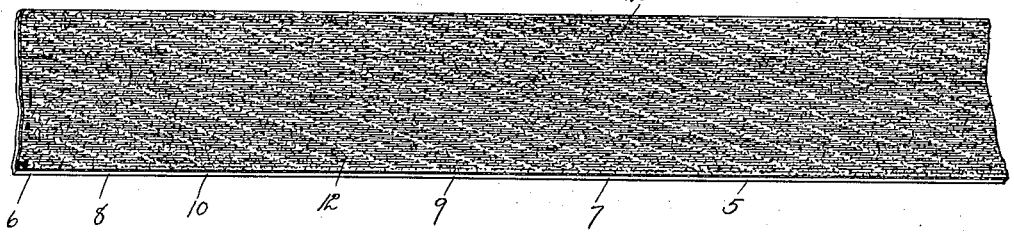
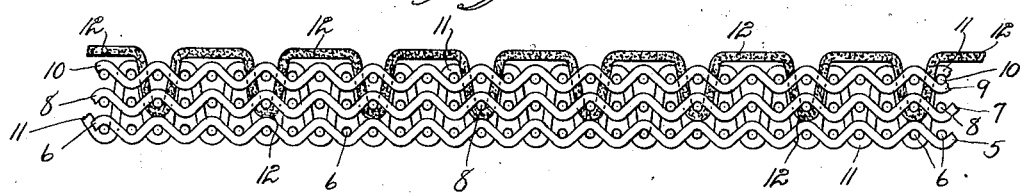

Patented Jan. 12, 1926.

1,569,579

UNITED STATES PATENT OFFICE.

THOMAS M. RUSSELL, OF MIDDLETOWN, CONNECTICUT, ASSIGNOR TO THE RUSSELL MFG. CO., OF MIDDLETOWN, CONNECTICUT, A CORPORATION.

FRICTION LINING.

Application filed January 2, 1924. Serial No. 683,850.

*To all whom it may concern:*

Be it known that I, THOMAS M. RUSSELL, a citizen of the United States, residing at Middletown, in the county of Middlesex and State of Connecticut, have invented a new and useful Improvement in Friction Linings; and I do hereby declare the following, when taken in connection with the accompanying drawings and the characters of reference marked thereon, to be a full, clear, and exact description of the same, and which said drawings constitute part of this application, and represent, in—

Fig. 1 a perspective view of a broken section of friction lining embodying my invention.

Fig. 2 a diagrammatic view in longitudinal section thereof, showing one form of weave which may be employed in carrying out my invention.

My invention relates to an improved friction lining designed with particular reference to use on the transmission- and brake-bands of automobiles and in kindred situations where friction bands operate in a bath or spray of lubricant, the object being to provide a friction band of superior strength and durability, with particular reference to superior efficiency in the retention and diffusion of the oil, whereby the undue wear and the charring of the face of the lining is prevented.

With these ends in view, my invention consists in a friction lining characterized by having a back of oil-distributing and cushioning threads and a facing of friction threads, these two classes of threads being interwoven so that they are brought into intimate relation between the two faces of the fabric.

My invention further consists in a friction lining having certain details of construction as will be hereinafter described and pointed out in the claim.

I would have it understood that I do not limit myself to threads of any particular material or to any particular weave, so long as the above stated characteristics of my improved friction lining are preserved, since threads of different materials and a wide variety of weaves might be utilized in producing my improved product.

For the purpose of illustration, I have shown a lining consisting of a three-ply cotton facing and a wool-back, the three cotton plies respectively consisting of interwoven warp-threads 5 and weft-threads 6, warp-threads 7 and weft-threads 8, and warp-threads 9 and weft-threads 10, these plies being bound together by a binder-thread 11, which reaches from front to back of the three plies. The wool-back is made up of wool-warps 12, which are carried from back to front, so as to be looped over the weft-threads 8 of the intermediate cotton ply. As thus woven, the wool threads 12, forming the oil-distributing and resilient back of the lining, are carried forward into the very body of the friction-producing cotton threads, into which they carry and diffuse the oil, so as to insure the abundant supply thereof thereto, thus guarding the facing from undue wear and charring. Furthermore, with the wool and cotton threads so interwoven and incorporated, the resulting fabric is not only stronger and more durable, but also more efficient than the similar friction fabrics of the prior art, in which the wool and cotton surfaces have been made separately and adhered by some sort of adhesive or fastened together by stitching,— objectionable on account of the liability, on the one hand, of the adhesive to deteriorate and allow the wool and cotton layers to separate, and, on the other hand, on account of the inevitable wearing through of the stitching and the consequent destruction of the bond between the two layers. Moreover, when the woolen and cotton threads are interwoven and incorporated, as described, the combined influence of the lubricant, pressure and heat, tending to harden the wool, is reduced to the minimum, whereby the cushioning effect of the back of the lining is maintained at a high pitch of efficiency and "chattering" in large measure avoided. I am aware that wool fabrics have been provided with cotton backs, reducing the cost and retaining the appearance of wool. Such fabrics have been treated to render them waterproof, and have been used extensively in the production of waterproof garments for personal wear.

I claim:

A thick, narrow ribbon having selvage edges for use in oil-immersed brakes and transmissions, the said ribbon consisting of a facing of cotton threads and a backing of woolen threads, such woolen and cotton threads being interwoven between the two faces of the fabric, whereby the woolen threads, with their relatively-greater, lubricant-diffusing ability, carry the lubricant forward into the cotton threads, which are thus kept lubricated and prevented from undue wear and charring, the matting and hardening of the friction cotton threads being also reduced.

In testimony whereof, I have signed this specification.

THOMAS M. RUSSELL.